United States Patent
Mahler et al.

(10) Patent No.: US 10,501,252 B1
(45) Date of Patent: Dec. 10, 2019

(54) PACKAGING MATERIAL HAVING PATTERNS OF MICROSPHERE ADHESIVE MEMBERS THAT ALLOW FOR BENDING AROUND OBJECTS

(71) Applicant: Amazon Technologies, Inc., Seattle, WA (US)

(72) Inventors: Justine Lea Mahler, Seattle, WA (US); Kimberly Sue Houchens, Seattle, WA (US); Brent Linderberg, St. Charles, IL (US); Jenna Walsh, St. Charles, IL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/661,841

(22) Filed: Jul. 27, 2017

(51) Int. Cl.
*B65D 81/02* (2006.01)
*B65D 65/14* (2006.01)

(52) U.S. Cl.
CPC ........... *B65D 81/022* (2013.01); *B65D 65/14* (2013.01)

(58) Field of Classification Search
CPC ............................ B65D 81/022; B65D 65/14
USPC ................... 229/87.02, 91; 206/521–524
See application file for complete search history.

(56) References Cited

U.S. PATENT DOCUMENTS

| | | | |
|---|---|---|---|
| 5,532,039 A * | 7/1996 | Payne | B32B 3/12 428/116 |
| 5,571,592 A | 11/1996 | McGregor et al. | |
| 5,759,624 A * | 6/1998 | Neale | B05D 5/00 220/592.17 |
| 5,952,068 A * | 9/1999 | Neale | B65D 81/3823 428/36.5 |
| 6,026,527 A * | 2/2000 | Pearce | A43B 13/04 428/137 |
| 6,265,040 B1 | 7/2001 | Neale et al. | |
| 6,277,454 B1 * | 8/2001 | Neale | B65D 81/3823 220/592.22 |

(Continued)

FOREIGN PATENT DOCUMENTS

| | | | |
|---|---|---|---|
| JP | 01213173 A * | 8/1989 | |
| WO | WO 2016/014486 A1 | 1/2016 | |
| WO | WO 2018/102558 A1 | 6/2018 | |

OTHER PUBLICATIONS

Machine translation of the description of JP 01213173 A.*

(Continued)

*Primary Examiner* — Jes F Pascua
(74) *Attorney, Agent, or Firm* — BakerHostetler

(57) ABSTRACT

In one embodiment, a packaging material wraps around an object so as to protect the object from damage. The material has a substrate and a plurality of adhesive members adhered to the substrate, each having a plurality of microspheres. The adhesive members are arranged on the surface in a pattern so as to define first and second pluralities of pairs of linear arrays of the adhesive members. The linear arrays of the first plurality are elongate along a first direction and are spaced from one another so as to define a first bending gap between the linear arrays in each pair of the first plurality. The linear arrays of the second plurality are elongate along a second direction, angularly offset from the first direction, and are spaced from one another so as to define a second bending gap between the linear arrays of each pair of the second plurality.

15 Claims, 6 Drawing Sheets

(56) References Cited

U.S. PATENT DOCUMENTS

| | | | |
|---|---|---|---|
| 6,740,373 B1* | 5/2004 | Swoboda | B32B 29/06 229/5.81 |
| 8,011,511 B2* | 9/2011 | Oyler | B31D 5/0078 206/523 |
| 9,522,772 B2 | 12/2016 | Fu et al. | |
| 9,580,228 B2 | 2/2017 | Fu et al. | |
| 9,591,937 B2 | 3/2017 | Fu et al. | |
| 9,648,969 B2 | 5/2017 | Fu et al. | |
| 2003/0152724 A1 | 8/2003 | Swoboda et al. | |
| 2007/0228134 A1* | 10/2007 | Cook | B65D 81/3874 229/403 |
| 2008/0268206 A1* | 10/2008 | Maldonado Arellano | C09J 179/08 428/172 |
| 2008/0282455 A1* | 11/2008 | Jones | A41D 31/085 2/458 |
| 2009/0214837 A1* | 8/2009 | Albenice | B32B 7/12 428/195.1 |
| 2009/0321508 A1* | 12/2009 | Fu | B29C 44/1233 229/403 |
| 2010/0089779 A1* | 4/2010 | Bowers | A45C 7/0095 206/320 |
| 2010/0181328 A1* | 7/2010 | Cook | A47G 23/0216 220/674 |
| 2011/0317568 A1 | 12/2011 | Flinta et al. | |
| 2012/0048450 A1* | 3/2012 | Fu | B29C 35/10 156/83 |
| 2012/0211500 A1* | 8/2012 | Amron | B65D 81/3874 220/592.16 |
| 2012/0285972 A1* | 11/2012 | Fu | B65D 81/3853 220/592.2 |
| 2013/0110067 A1* | 5/2013 | Carlucci | A61F 13/534 604/370 |
| 2013/0160945 A1* | 6/2013 | Huang | C08L 3/02 156/328 |
| 2013/0303351 A1* | 11/2013 | Fu | B65D 81/3823 493/54 |
| 2014/0087109 A1* | 3/2014 | Huang | B65D 81/3858 428/36.5 |
| 2014/0131367 A1* | 5/2014 | Bordary | B65D 81/3874 220/592.25 |
| 2016/0263876 A1* | 9/2016 | Huang | D21H 19/12 |
| 2016/0264339 A1 | 9/2016 | Fu et al. | |
| 2017/0130058 A1* | 5/2017 | Huang | C09D 201/00 |
| 2018/0148246 A1* | 5/2018 | Fu | B65D 81/3897 |
| 2019/0031415 A1* | 1/2019 | Kumar | B32B 7/14 |
| 2019/0062028 A1* | 2/2019 | Getty | B65D 81/022 |

OTHER PUBLICATIONS

International Patent Application No. PCT/US2018/042333; Int'l Search Report and the Written Opinion; dated Sep. 19, 2018; 16 pages.

* cited by examiner

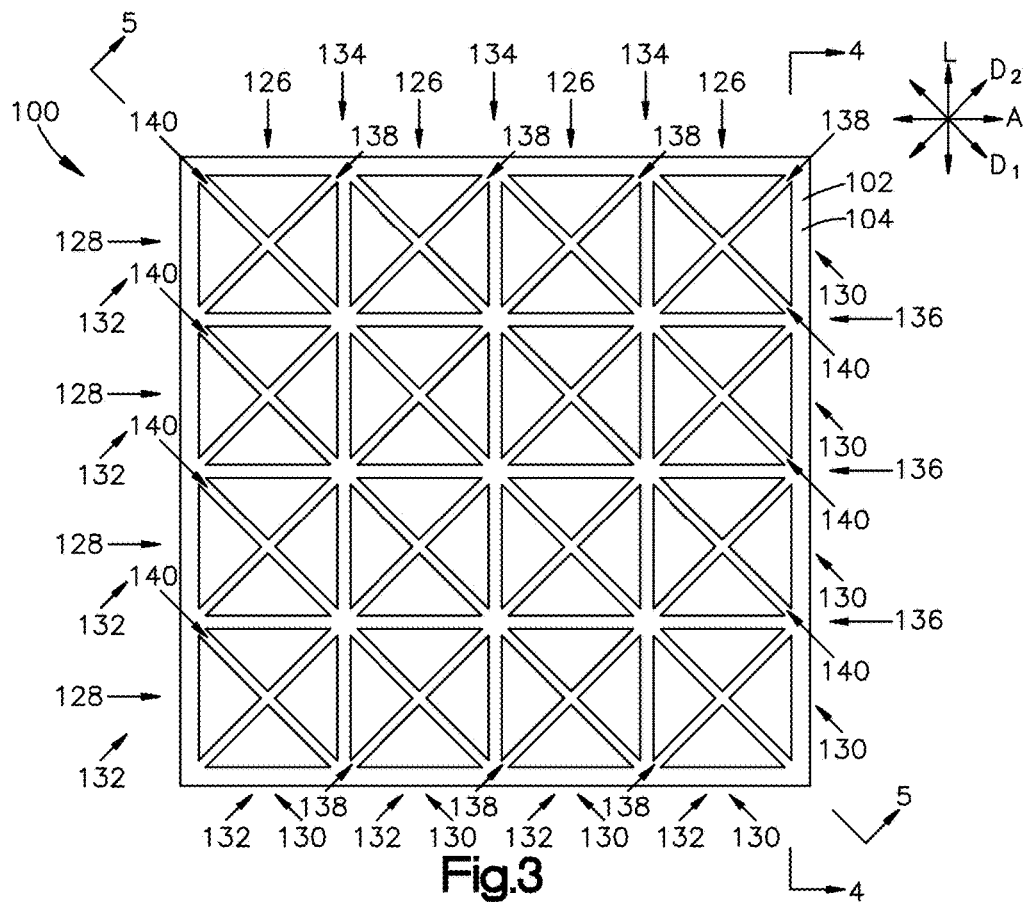
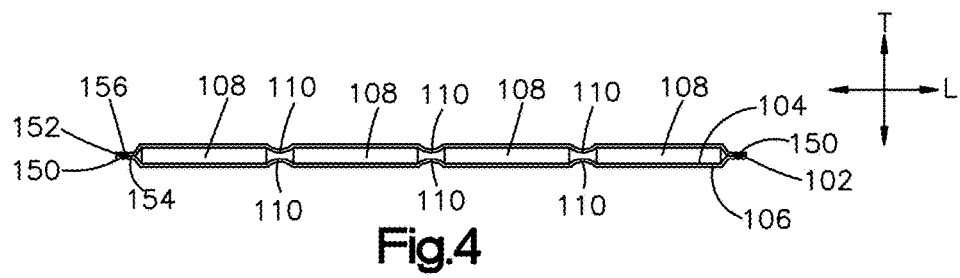
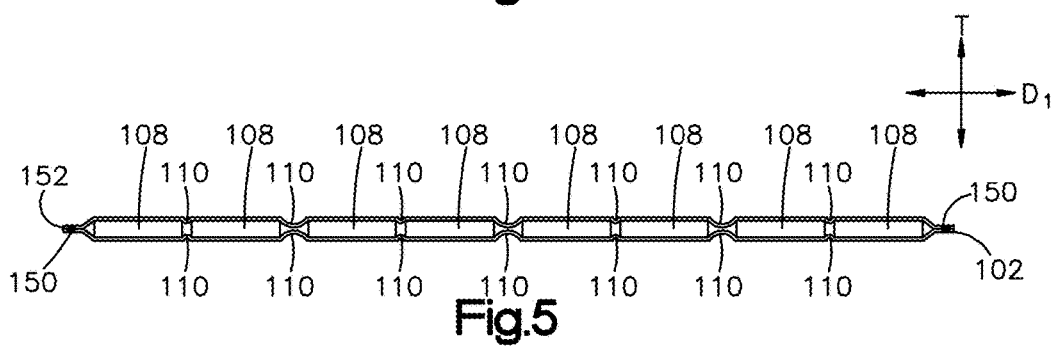

PACKAGING MATERIAL HAVING PATTERNS OF MICROSPHERE ADHESIVE MEMBERS THAT ALLOW FOR BENDING AROUND OBJECTS

BACKGROUND

A variety of packaging materials are commonly used for shipping items. For example, some common packaging materials include bubble wrap, thin film pillow packs, and Styrofoam. Typically these packaging materials are selected to provide a desired level of impact resistance and/or thermal resistance to protect the product being shipped from damage. However, these packaging materials typically are not curbside recyclable.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3 shows a plan view of the packaging material of FIG. 1 without showing an upper substrate;

FIG. 4 shows a cross-sectional view of the packaging material of FIG. 1 at section 4-4 with an upper substrate;

FIG. 5 shows a cross-sectional view of the packaging material of FIG. 1 at section 5-5 with an upper substrate;

DETAILED DESCRIPTION

Figure 1:
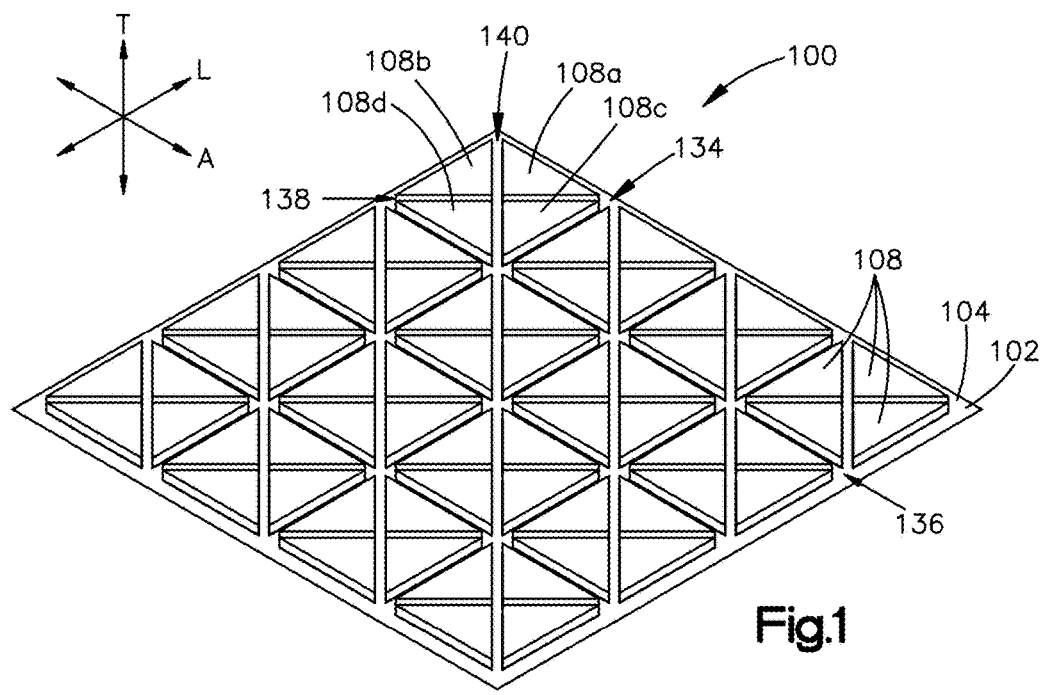
FIG. 1 shows a perspective view of a packaging material having adhesive members arranged in a first pattern according to one embodiment, where the packaging material is shown without an upper substrate for illustrative purposes.
Figure 2:
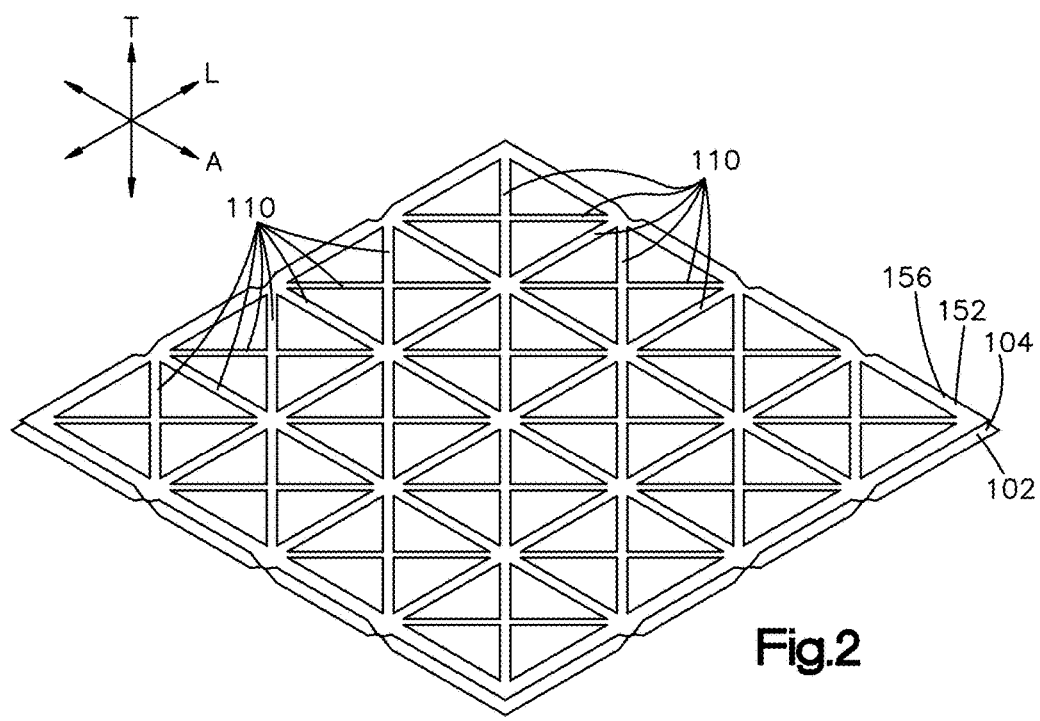
FIG. 2 shows a perspective view of the packaging material of FIG. 1 with an upper substrate.

Referring generally to FIGS. 1 to 12, various embodiments of a packaging material or component 100 are shown that are configured to be wrapped around objects so as to protect the objects from damage during handling. In each embodiment, the packaging material 100 is configured to be bent along different axes so as to at least partially conform to the particular object being wrapped. In some embodiments, the packaging material 100 can conform to the object so as to limit the air space between the packaging material 100 and the object. The packaging material 100 comprises a bendable substrate 102 having a first surface 104. The packaging material 100 further comprises a plurality of adhesive members 108 adhered to the surface 104, where each adhesive member 108 comprises a plurality of expandable or expanded microspheres 112 (see FIGS. 10 to 12). The adhesive members 108 are arranged on the first surface 104 in a pattern so as to define at least a first pair of linear arrays (e.g., 126, 128, 130, or 132) of the adhesive members 108 that extend along a first direction and are spaced from one another so as to define a first gap (e.g., 134, 136, 138, or 140) that is elongate along the first direction between the linear arrays of the first pair. The adhesive members 108 are further arranged on the first surface 104 so as to define at least a second pair of linear arrays (e.g., 126, 128, 130, or 132) of the adhesive members that extend along a second direction and are spaced from one another so as to define a second gap (e.g., 134, 136, 138, or 140) that is elongate along the second direction between the linear arrays of the second pair. The second direction is angularly offset from the first direction. For example, the second direction can be at a right angle or an oblique angle to the first direction. The packaging material 100 is configured to be bent along the first gap and the second gap to at least partially conform to the object being wrapped. Thus, each gap defines a bending axis along which the packaging material 100, and more particularly, the substrate 102, is configured to be bent. Further, the packaging material can provide for bending along at least two different directions, one direction along the first gap and another direction along the second gap. As used herein, the term "bend" and derivations thereof includes actions such as folding and rolling.

In each embodiment, the substrate 102 of the packaging material 100 includes the first surface 104 and a second surface 106, opposite the first surface 104 along a transverse direction T. The substrate 102 can be formed from a flexible and/or bendable material such as sheet of paper, cardboard, plastic, or any other suitable flexible and/or bendable packaging film or layer. In a preferred embodiment, the substrate 102 is tissue paper. The substrate 102 can have a planar configuration wherein the first and second surfaces 104 and 106 are parallel to one another. Further, the substrate 102 can have a length along a longitudinal direction L, a width along a lateral direction A, and a thickness along the transverse direction T, wherein the length and width are greater than the thickness. The longitudinal direction L, lateral direction A, and transverse direction A can all be substantially perpendicular to one another.

In each embodiment, the packaging material 100 can optionally include a second substrate 152. The second substrate 152 can be spaced from the substrate 102 along the transverse direction T such that the adhesive members 108 are disposed between the substrate 102 and the second substrate 152. The second substrate 152 can have a first surface 154 and a second surface 156, opposite the first surface 154 along the transverse direction T. The first surfaces 104 and 154 of the substrate 102 and the second substrate 152 can face one another. The substrate 102 and the second substrate 152 can optionally be attached to one another by an adhesive 150 at one or more edges of the packaging material 100. The adhesive members 108 can be adhered to both the substrate 102 and the second substrate 152 as shown. Thus, the adhesive members 108 can extend from the substrate 102 to the second substrate 152 along the transverse direction T. In alternative embodiments (not shown), the adhesive members 108 can be adhered to the substrate 102 but not the second substrate 152.

Similar to substrate 102, the second substrate 152 can be formed from a flexible and/or bendable material such as sheet of paper, cardboard, plastic, or any other suitable flexible and/or bendable packaging material. In a preferred embodiment, the second substrate 152 is tissue paper. The second substrate 152 can have a planar configuration wherein the first and second surfaces 154 and 156 are parallel to one another. Further, the second substrate 152 can have a length along the longitudinal direction L, a width along the lateral direction A, and a thickness along the transverse direction T, wherein the length and width are greater than the thickness.

In some embodiments, such as embodiments that implement the patterns of FIGS. 1 to 8, one or both of the substrate 102 and the second substrate 152 can include score lines 110 that are aligned with at least one, up to all of the gaps along the transverse direction T. Each score line 110 is configured to promote bending between a respective pair of the linear arrays. Thus, each score line 110 can enable a smaller bending force of the packaging material 100 between a respective pair of the linear arrays than if the score line 110 was not present. Each score line 110 can be formed using any suitable technique, including (without limitation) embossing and/or debossing. For example, each score line 110 can define a channel, preferably a channel that is u-shaped or v-shaped in transverse cross section, that extends into the second surface 106 or 156 of a respective one of the substrates 102 and 152 towards the first surface 104 or 154 of the respective one of the substrates 102 and 152. Alternatively, the score line can be configured as a channel having a cross sectional shape other than a V-shape, and the score line may be formed by other means, such as by perforations through or partially through the structure. Each score line 110 can define a bending axis, along which the packaging material 100 is configured to be bent.

Each linear array (e.g., 126, 128, 130, and 132) has a plurality of array elements that are spaced from one another along a length of the array. Each array element comprises at least one adhesive member 108. In some embodiments, each array element can comprise a plurality of adhesive members 108. Each adhesive member 108 can have any suitable cross-sectional shape such as (without limitation) a triangle, a pentagon, a hexagon, a circle, or a quadrilateral such as a square, rectangle, trapezoid, rectangle, trapezoid, or diamond. In some embodiments, the packaging material 100 can have adhesive members 108 with a plurality of different shapes. Each adhesive member 108 can also have an overall height from the surface 104.

Figure 10:
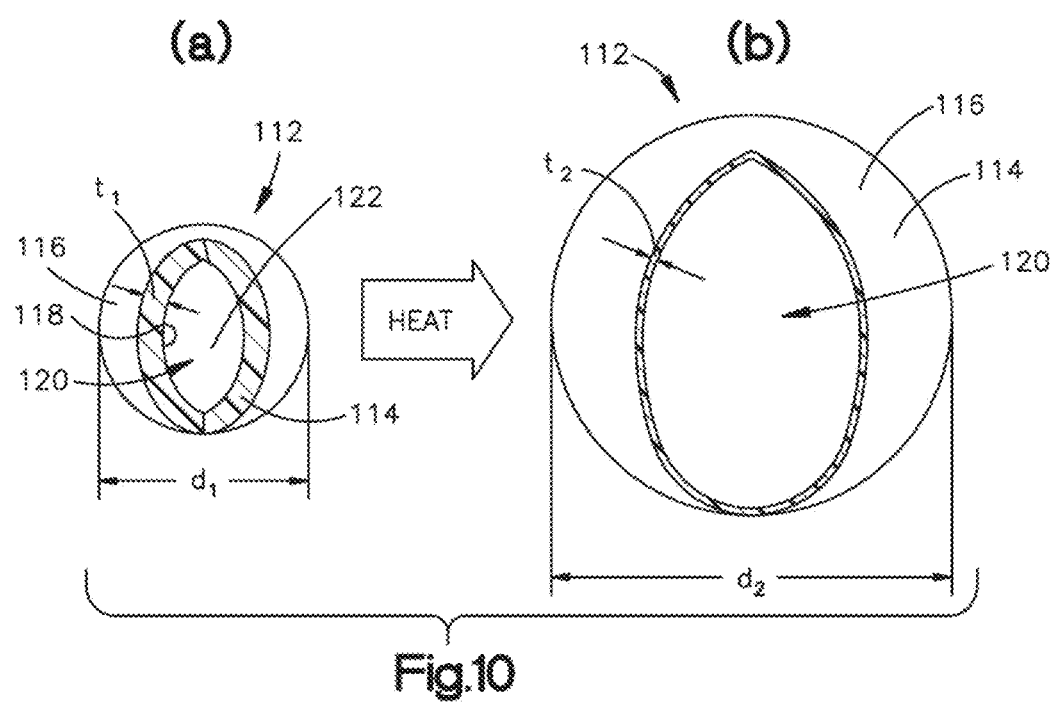
FIG. 10 shows a schematic diagram of a microsphere of the packaging material of FIGS. 1 to 9 in an un-activated state (a) and activated state (b)
Figure 11:
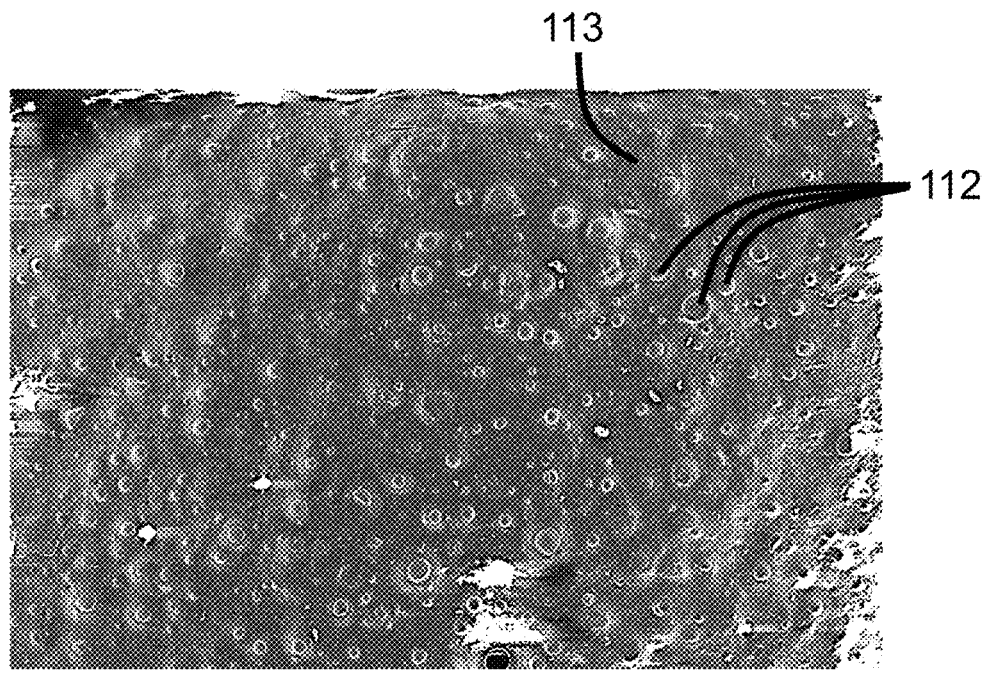
FIG. 11 shows a magnified view of the microspheres of the adhesive members of FIGS. 1 to 9 in an unactivated state at 500 times magnification.
Figure 12:
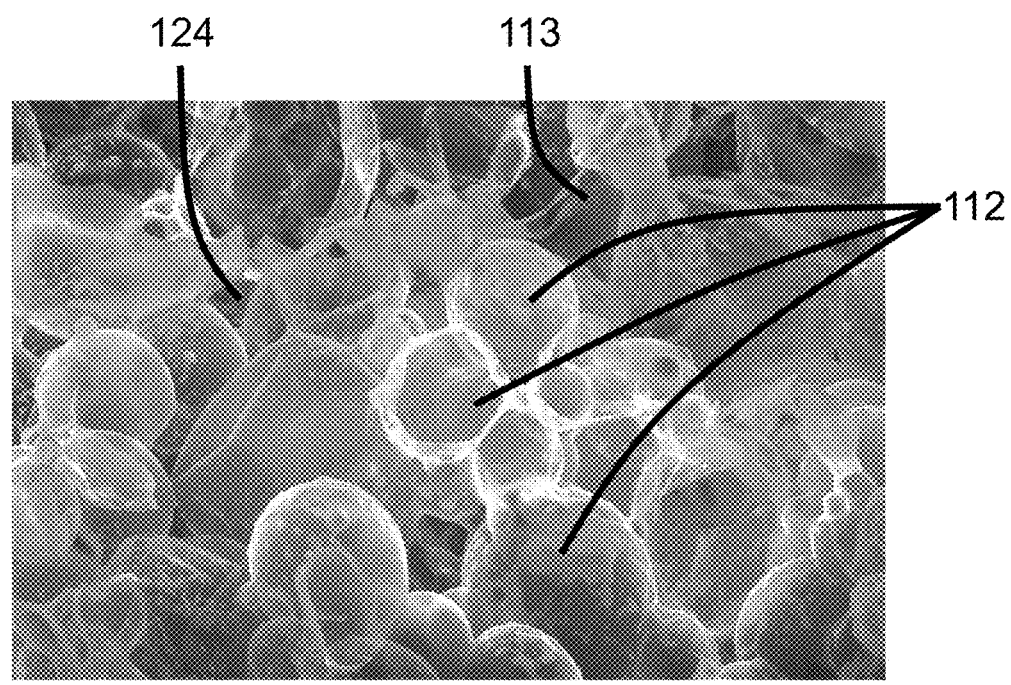
FIG. 12 shows a magnified view of the microspheres of the adhesive members of FIGS. 1 to 9 in an activated state at 500 times magnification.

Turning briefly to FIGS. 10 to 12, each adhesive member 108 comprises a material having a plurality of un-activated (unexpanded) or activated (expanded) microspheres 112. In the activated state, the microsphere adhesive members 108 provide cushioning and/or thermal protection to the object that is wrapped in the packaging material. The microspheres 112 can be microspheres manufactured by Akzo Nobel under the name Expancel or other name, or by another manufacturer. The microspheres 112 can be dispersed in a binder material 113 such as a water-soluble and/or water-based adhesive so as to form a microsphere adhesive that is configured to adhere the adhesive members 108 to the substrate 102. As used herein, the term "microsphere adhesive" refers to a material that includes microspheres that are expandable or have expanded in response to exposure to an energy source. Examples of microsphere adhesives include AQUENCE ENV 4200X from Henkel AG & Company, KGaA, such as AQUENCE ENV 42000 and AQUENCE ENV 42001 MFA, which expand upon exposure to convection and microwave heating, respectively.

Each microsphere 112 comprises an outer shell 114. In at least some embodiments, the outer shell 114 is a thermoplastic shell. The outer shell 114 can have a substantially spherical outer surface 116 and a substantially spherical inner surface 118, opposite the substantially spherical outer surface 116. The outer surface 116 of each microsphere 112 has an un-activated outer diameter $d_1$ in the un-activated state (a), and an activated outer diameter $d_2$ in the activated state (b). The activated diameter $d_2$ is greater than the un-activated diameter $d_1$. In some embodiments, the un-activated diameter $d_1$ can range from about 5 microns to about 20 microns, and the activated diameter $d_2$ can range from about 35 microns to about 60 microns. Further, in some such embodiments, the un-activated diameter $d_1$ can range from about 10 microns to about 15 microns, and the activated diameter $d_2$ can range from about 40 microns to about 50 microns.

The outer shell 114 of each microsphere 112 also has an un-activated thickness $t_1$ from the outer surface 116 to the inner surface 118 in the un-activated state (a) and an activated thickness $t_2$ from the outer surface 116 to the inner surface 118 in the activated state (b). The un-activated thickness $t_1$ is greater than the activated thickness $t_2$. Thus, as each microsphere 112 expands, the thickness of the outer shell 114 of the microsphere 112 decreases. The inner surface 118 of each microsphere 112 defines a void 120. In at least some embodiments, each void 120 can be filled with a hydrocarbon 122. As energy such as heat is applied to each microsphere 112, the hydrocarbon 122 in the microsphere 112 expands thereby causing the microsphere 112 to expand. It will be understood that various types of heating, such as (without limitation) convection heating, microwave heating, and RF heating, may be applied to cause the microspheres 112 to expand. Further, other types of energy such as (without limitation) pressure, ultrasound, ultra-violet rays, x-rays, or a chemical reaction may be applied to cause the microspheres 112 to expand.

When expanded, the adhesive members 108 can define a plurality of gas pockets 124 generated by the expanded microspheres 112. The gas pockets 124 can be defined in the voids 120 of the microspheres 112 after the hydrocarbon 122 burns off or passes through the shell 114. In at least some embodiments, gas pockets 124 can additionally or alternatively be defined between microspheres 112. Gas within the gas pockets 124 functions as an insulator. The expanded adhesive members 108 can have an R value (unit of thermal resistance) similar to Styrofoam, normalized by thickness. Additionally, when expanded, the adhesive members 108 can have an elastic property that can provide impact resistance. In fact, the adhesive members 108 can have a soft, puffy like structure after expansion. The adhesive members 108 can have approximately 45%, or up to as much as approximately 75%, greater impact resistance than a bubble wrap of equivalent thickness. Using a water-based and/or water-soluble adhesive enables the microspheres 112 to be easily removed from the substrate 102 to during the recycling process. Repulpability and recycling studies confirm that packaging made from microsphere adhesives can have a 91.2% fiber recovery rate, compared to a recovery rate of 92.9% for corrugate, and well exceeding the 80% yield rate criteria provided by the Fibre Box Association (FBA). Depending on the amount of microsphere adhesive, the recovery rate can be greater than or less than 91.2%. Additionally, microsphere adhesives are certified as Direct Food Contact Safe per the Federal Drug Administration (FDA) regulations, and therefore can be used in food packaging applications.

The packaging material 100 can be delivered with the adhesive members 108 in an un-activated (unexpanded) state or an activated (expanded) state. In some situations, it may be preferable to transport the packaging material 100 in the un-activated state as the packaging material 100 occupies less space when it is in the un-activated (un-expanded) state than when it is in the activated (expanded) state. Thus, embodiments of the disclosure can include packaging material 100 having adhesive members in either the un-activated state or the activated state.

Referring now more specifically to the embodiment of FIGS. 1 to 5, the packaging material 100 has a plurality of longitudinal linear arrays 126 that extend along the longitudinal direction L and are spaced from one another along the lateral direction A by gaps 134. The gaps 134 are elongate along the longitudinal direction L and are substantially parallel to one another. Each longitudinal linear array 126 comprises a plurality of array elements that are spaced from one another along the longitudinal direction L. Similarly, the packaging material 100 has a plurality of lateral linear arrays 128 that extend along the lateral direction A and are spaced from one another along the longitudinal direction L by gaps 136. The gaps 136 are elongate along the lateral direction A, and are substantially parallel to one another. Each lateral linear array 126 comprises a plurality of array elements that are spaced from one another along the lateral direction A. In this example, each longitudinal linear array 126 and each lateral linear array 128 has four array elements, although it will be understood that alternative embodiments can have fewer than or more than four array elements. Further, it will be understood that the number of array elements in each longitudinal linear array 126 can be greater than, less than, or equal to the number of array elements in each lateral linear array 128.

Each array element of the longitudinal and lateral linear arrays 126 and 128 has a quadrilateral shape such as a rectangle or square. Further each array element comprises a plurality of adhesive members 108 that defines the square. For instance, each array element comprises four triangular-shaped adhesive members 108a to 108d. The first to fourth adhesive members 108a to 108d are arranged such that a vertex of each triangle is oriented towards a center of the square. For instance, the first and fourth triangular-shaped adhesive members 108a and 108d point towards one another along the longitudinal direction L, and second and third triangular-shaped adhesive members 108b and 108c point towards one another along the lateral direction A. In some embodiments, each adhesive member 108a to 108d can have the shape of an isosceles right triangle, where the vertex adjacent the right angle is oriented towards the center of the square and the hypotenuse defines an outer edge of the square.

The first and third adhesive members 108a and 108c are spaced from the second and fourth adhesive members 108b and 108d so as to at least partially define a gap 140 that extends along a first oblique direction $D_1$. The first oblique direction $D_1$ is oblique with respect to the longitudinal direction L and the lateral direction A. Similarly, the first and second adhesive members 108a and 108b are spaced from the third and fourth adhesive members 108c and 108d so as to at least partially define a gap 138 that extends along a second oblique direction $D_2$. The second oblique direction $D_2$ is oblique with respect to the longitudinal direction L and the lateral direction A. In some embodiments, such as when the adhesive members are implemented as isosceles right triangles, the second oblique direction $D_2$ can be at a right angle with respect to the first oblique direction $D_2$, and the first and second oblique directions $D_1$ and $D_2$ can each be at a 45 degree angle with respect to each of the longitudinal direction L and the lateral direction A.

The packaging material 100 has a plurality of first oblique linear arrays 130 that extend along the first oblique direction $D_1$ and are spaced from one another along the second oblique direction $D_2$ by gaps 140. The gaps 140 are elongate along the first oblique direction $D_1$ and are substantially parallel to one another. Each of the first oblique linear arrays 130 comprises a plurality of array elements that are offset from one another along the first oblique direction $D_1$. Each array element is an adhesive member 108.

Similarly, the packaging material 100 has a plurality of second oblique linear arrays 132 that extend along the second oblique direction $D_2$ and are spaced from one another along the first oblique direction $D_1$ by gaps 138. The gaps 138 are elongate along the second oblique direction $D_2$ and are substantially parallel to one another. Each of the second oblique linear arrays 132 comprises a plurality of array elements that are offset from one another along the second oblique direction $D_2$. Each array element is an adhesive member 108.

The packaging material 100 of FIGS. 1 to 5 allows for bending between adhesive members 108 in up to four different directions that include the longitudinal direction L, the lateral direction A, the first oblique direction $D_1$, and the second oblique direction $D_2$. It will be understood that alternative embodiments may allow for bending along as few as two directions or more than four directions.

Figure 6:
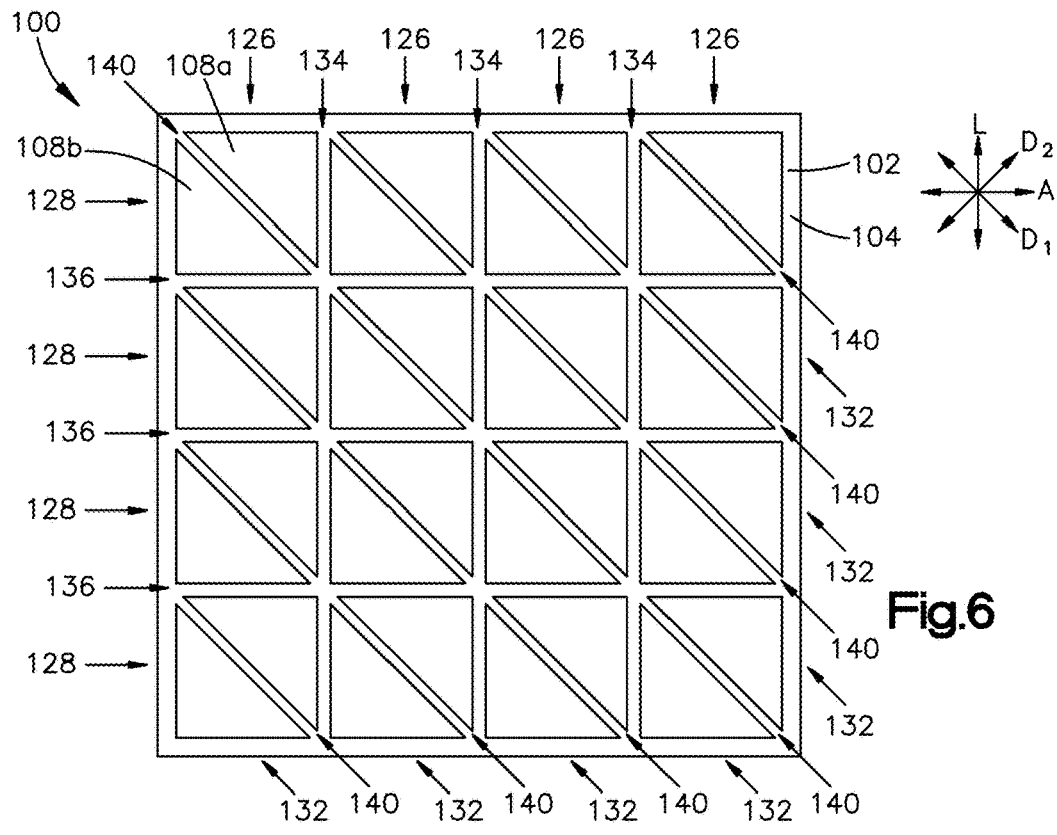
FIG. 6 shows a top plan view of a packaging material having adhesive members arranged in another pattern according to another embodiment, where the packaging material is shown without an upper substrate for illustrative purposes.

According to various embodiments, the pattern and/or the shape of the adhesive members 108 can vary from those shown in FIGS. 1 to 5. For example, FIG. 6 shows an alternative embodiment that where each square array element of each longitudinal linear array 126 and each lateral linear array 128 comprises only two triangular-shaped adhesive members 108a and 108b. The packaging material 100 of FIG. 6 allows for bending between adhesive members 108 along up to three different directions that include the longitudinal direction L, the lateral direction A, and the first oblique direction $D_1$.

The packing material 100 has longitudinal linear arrays 126 that extend along the longitudinal direction L and are spaced from one another along the lateral direction A by gaps 134. The gaps 134 are elongate along the longitudinal direction L and are substantially parallel to one another. The array elements of each longitudinal linear array 126 are spaced from one another along the longitudinal direction L. Similarly, The packing material 100 has lateral linear arrays 128 that extend along the lateral direction A and are spaced from one another along the longitudinal direction L by gaps 136. The gaps 136 are elongate along the lateral direction A, and are substantially parallel to one another. The array elements of each lateral array 126 are spaced from one another along the lateral direction A. Each longitudinal linear array 126 and each lateral linear array 128 has four array elements, although it will be understood that alternative embodiments can have fewer than or more than four array elements. Further, it will be understood that the number of array elements in each longitudinal linear array 126 can be greater than, less than, or equal to the number of array elements in each lateral linear array 128.

Each array element comprises two triangular-shaped adhesive members 108a and 108b that defines the square shape. The first and second adhesive members 108a and 108b can be right triangles. Further, the adhesive members 108a and 108b can be arranged such that their hypotenuses face one another, and such that their legs define the outer edges of the square. The first and second adhesive members 108a and 108b of each array element are spaced from one another so as to at least partially define a gap 140 that extends along the first oblique direction $D_1$. The first oblique direction $D_1$ is oblique with respect to the longitudinal direction L and the lateral direction A.

The packaging material 100 has a plurality of first oblique linear arrays 130 that extend along the first oblique direction $D_1$ and are spaced from one another along the second oblique direction $D_2$ by gaps 140. Each of the first oblique linear arrays 130 comprises a plurality of array elements that are offset from one another along the first oblique direction $D_1$. Each array element is an adhesive member 108.

Figure 7:
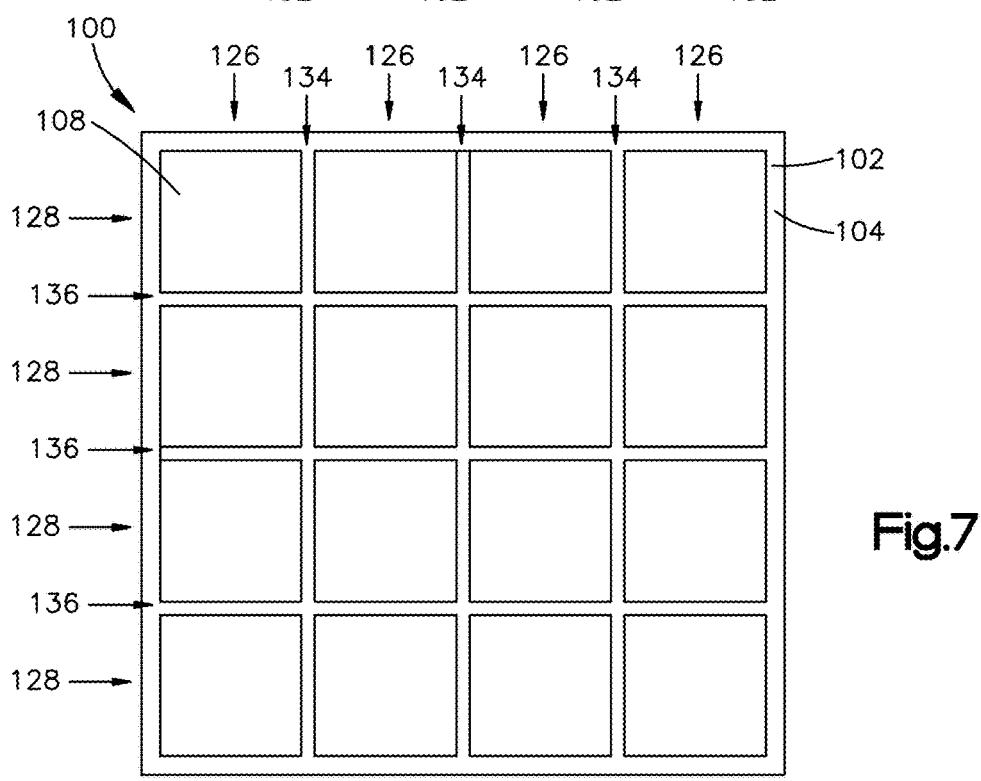
FIG. 7 shows a top plan view of a packaging material having adhesive members arranged in yet another pattern according to yet another embodiment, where the packaging material is shown without an upper substrate for illustrative purposes.

As another example, FIG. 7 shows an alternative embodiment where each square array element of each longitudinal linear array 126 and each lateral linear array 128 comprises a single square-shaped adhesive member 108 as opposed to triangular-shaped adhesive members. The packaging material 100 of FIG. 7 allows for bending between adhesive members 108 along up to two different directions that include the longitudinal direction L and the lateral direction A.

The packaging material 100 has longitudinal linear arrays 126 that extend along the longitudinal direction L and are spaced from one another along the lateral direction A by gaps 134. The gaps 134 are elongate along the longitudinal direction L and are substantially parallel to one another. The array elements of each longitudinal linear array 126 are spaced from one another along the longitudinal direction L. Similarly, the packing material 100 has lateral linear arrays 128 that extend along the lateral direction A and are spaced from one another along the longitudinal direction L by gaps 136. The gaps 136 are elongate along the lateral direction A and are substantially parallel to one another. The array elements of each lateral array 126 are spaced from one another along the lateral direction A. Each longitudinal linear array 126 and each lateral linear array 128 has four array elements, although it will be understood that alternative embodiments can have fewer than or more than four array elements. Further, it will be understood that the number of array elements in each longitudinal linear array 126 can be greater than, less than, or equal to the number of array elements in each lateral linear array 128.

Figure 8:
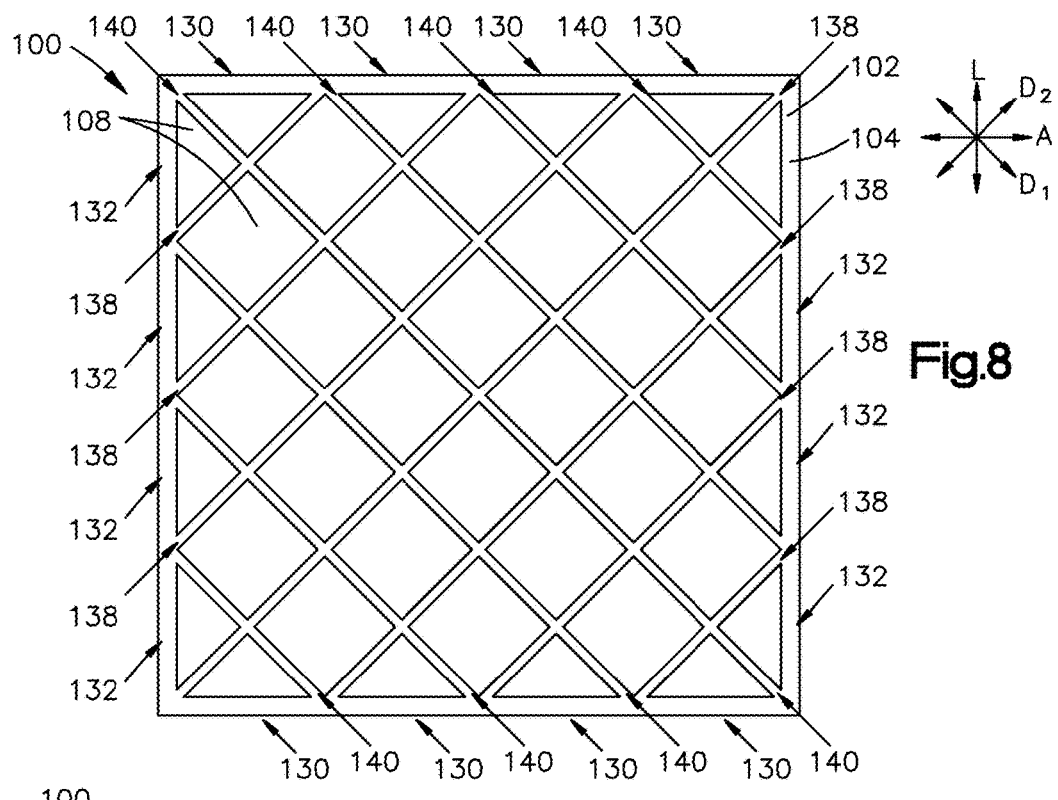
FIG. 8 shows a top plan view of a packaging material having adhesive members arranged in even yet another pattern according to even yet another embodiment, where the packaging material is shown without an upper substrate for illustrative purposes.

As yet another example, FIG. 8 shows an alternative embodiment where each array element is either diamond shaped or triangular. The packaging material 100 of FIG. 8 allows for bending between adhesive members 108 along up to two different directions that include the first oblique direction $D_1$ and the second oblique direction $D_2$. The packaging material 100 has a plurality of first oblique linear arrays 130 that extend along the first oblique direction $D_1$ and are spaced from one another along the second oblique direction $D_2$ by gaps 140. The gaps 140 are elongate along the first oblique direction $D_1$ and are substantially parallel to one another. Each of the first oblique linear arrays 130 comprises a plurality of array elements that are offset from one another along the first oblique direction $D_1$. Similarly, the packaging material 100 has a plurality of second oblique linear arrays 132 that extend along the second oblique direction $D_2$ and are spaced from one another along the first oblique direction $D_1$ by gaps 138. The gaps 138 are elongate along the second oblique direction $D_2$ and are substantially parallel to one another. Each of the second oblique linear arrays 132 comprises a plurality of array elements that are offset from one another along the second oblique direction $D_2$.

Figure 9:
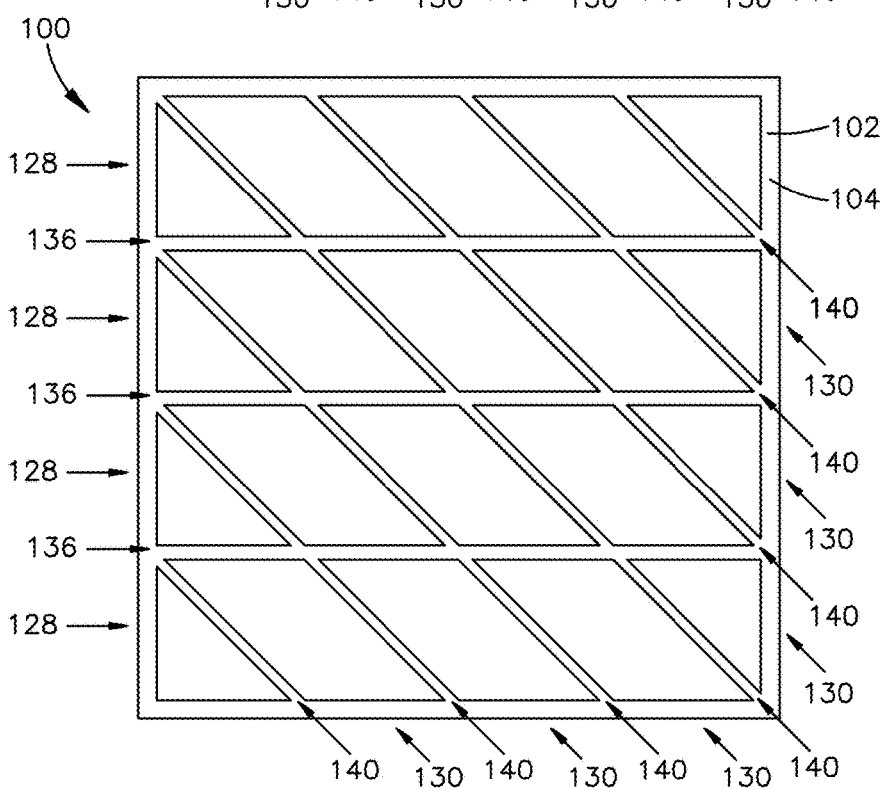
FIG. 9 shows a top plan view of a packaging material having adhesive members arranged in yet still another pattern according to yet still another embodiment, where the packaging material is shown without an upper substrate for illustrative purposes.

As yet still another example, FIG. 9 shows an alternative embodiment where each array element has a shape that is either a parallelogram or a triangle. The packaging material 100 of FIG. 9 allows for bending between adhesive members 108 along up to two different directions that include the lateral direction A and the first oblique direction $D_1$. The packing material 100 has lateral linear arrays 128 that extend along the lateral direction A and are spaced from one another along the longitudinal direction L by gaps 136. The gaps 136 are elongate along the lateral direction A and are parallel to one another. The array elements of each lateral array 126 are offset from one another along the lateral direction A. The packaging material 100 also has a plurality of first oblique linear arrays 130 that extend along the first oblique direction $D_1$ and are spaced from one another along the second oblique direction $D_2$ by gaps 140. The gaps 140 are elongate along the first oblique direction $D_1$ and are substantially parallel to one another. Each of the first oblique linear arrays 130 comprises a plurality of array elements that are offset from one another along the first oblique direction $D_1$.

Although example embodiments have be disclosed in which the gaps 134 are substantially parallel to one another, the gaps 136 are substantially parallel to one another, the gaps 138 are substantially parallel to one another, and the gaps 140 are substantially parallel to one another, embodiments of the disclosure are not so limited. Alternative embodiments can have a set of gaps that are angularly offset from one another. For example, in one such alternative embodiment, the gaps can extend along axes from a common center, such that the gaps fan out from the common center at different angles.

Further, although example embodiments have been disclosed in which each packaging material 100 has only a single pattern, embodiments of the disclosure are not so limited. In alternative embodiments, the packaging material 100 can have a combination of two or more different patterns.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

What is claimed:

1. A packaging material configured to be wrapped around an object so as to protect the object from at least one of impact damage and thermal damage, the packaging material comprising:
   a substrate having a surface; and
   a plurality of adhesive members adhered to the surface, each adhesive member having a triangular shape and comprising a plurality of microspheres that provide at least one of cushioning and thermal protection to the object when the microspheres are in an activated state,
   wherein the adhesive members are arranged on the surface in a pattern so as to define (i) a plurality of first linear arrays of the adhesive members, the first linear arrays being elongate along a first direction and being spaced from one another so as to define a plurality of first gaps therebetween that are elongate along the first direction, each first gap being defined by a plurality of linear edges of the adhesive members of the first linear arrays that are aligned with one another along the first direction, (ii) a plurality of second linear arrays of the adhesive members, the second linear arrays being elongate along a second direction, angularly offset from the first direction, and being spaced from one another so as to define a plurality of second gaps therebetween that are elongate along the second direction, each second gap being defined by a plurality of linear edges of the adhesive members of the second linear arrays that are aligned with one another along the second direction, and (iii) a plurality of third linear arrays of the adhesive members, the third linear arrays being elongate along a third direction, angularly offset from the first and second directions, and being spaced from one another so as to define a plurality of third gaps therebetween that are elongate along the third direction, each third gap being defined by a plurality of linear edges of the adhesive members of the third linear arrays that are aligned with one another along the third direction, and
   wherein the packaging material is configured to be bent along the first gaps, the second gaps, and the third gaps to at least partially conform to the object being wrapped.

2. The packaging material of claim 1, wherein the pattern defines (iv) a plurality of fourth linear arrays of the adhesive members, the fourth linear arrays being elongate along a fourth direction, angularly offset from the first, second, and third directions, and being spaced from one another so as to define a plurality of fourth gaps therebetween that are elongate along the fourth direction, each fourth gap being defined by a plurality of linear edges of the adhesive members of the fourth linear arrays that are aligned with one another along the fourth direction.

3. The packaging material of claim 1, wherein the substrate includes at least one score line, each being aligned with at least one, up to all of the first and second gaps, each score line defining a bending axis, along which the packaging material is configured to be bent.

4. A packaging material, comprising:
   a bendable substrate having a surface; and
   a plurality of adhesive members adhered to the surface, each adhesive member having a triangular shape and comprising a plurality of expandable microspheres,
   wherein the adhesive members are arranged on the surface in a pattern so as to define (i) a first pair of linear arrays of the adhesive members that extend along a first direction and are spaced from one another so as to define a first gap that is elongate along the first direction between the linear arrays of the first pair, each linear array of the first pair having a plurality of linear edges that are aligned with one another along the first direction so as to define the first gap, (ii) a second pair of linear arrays of the adhesive members that extend along a second direction, angularly offset from the first direction, and are spaced from one another so as to define a second gap that is elongate along the second direction between the linear arrays of the second pair, each linear array of the second pair having a plurality of linear edges that are aligned with one another along the second direction so as to define the second gap, and (iii) a third pair of linear arrays of the adhesive members that extend along a third direction, angularly offset from the first and second directions, and are spaced from one another so as to define a third gap that is elongate along the third direction between the linear arrays of the third pair, each linear array of the third pair having a plurality of linear edges that are aligned with one another along the third direction so as to define the third gap, and
   wherein the packaging material is configured such that the substrate bends between the adhesive members along the first gap, the second gap, and the third gap.

5. The packaging material of claim 4, wherein the second direction is substantially perpendicular to the first direction, and the third direction is at an oblique angle relative to both the first and second directions.

6. The packaging material of claim 4, wherein the adhesive members are arranged on the surface in a pattern so as to define a fourth pair of linear arrays of the adhesive members that extend along a fourth direction and are spaced from one another so as to define a fourth gap that is elongate along a fourth direction between the linear arrays of the fourth pair, each linear array of the fourth pair having a plurality of linear edges that are aligned with one another along the fourth direction so as to define the fourth gap, and wherein the fourth direction is angularly offset from the first, second and third directions, and the packaging material is configured such that the substrate bends along the fourth gap.

7. The packaging material of claim 6, wherein the first direction is perpendicular to the second direction, and the third and fourth directions are at an oblique angle relative to both the first and second directions, the third and fourth directions being at a non-zero angle relative to one another.

8. The packaging material of claim 4, wherein the substrate is formed from a sheet of paper.

9. The packaging material of claim 4, wherein the packaging material includes a second substrate, and the adhesive members are disposed between the substrate and the second substrate.

10. The packaging material of claim 4, wherein the substrate includes at least one score line, each being aligned with at least one, up to all of the gaps, each score line defining a bending axis, along which the packaging material is configured to be bent.

11. The packaging material of claim 10, wherein each score line defines a channel that extends into a second surface of the substrate, opposite the surface.

12. The packaging material of claim 4, wherein the pattern defines (i) a first plurality of pairs of linear arrays of the adhesive members, the linear arrays of the first plurality being elongate along the first direction and being spaced from one another so as to define a first gap between the linear arrays in each pair of the first plurality, the first gaps being elongate along the first direction, and (ii) a second plurality of pairs of linear arrays of the adhesive members, the linear arrays of the second plurality being elongate along the second direction and being spaced from one another so as to define a second gap between the linear arrays of each pair of the second plurality, the second gaps being elongate along the second direction.

13. The packaging material of claim 12, wherein the pattern defines (iii) a third plurality of pairs of linear arrays of the adhesive members, the linear arrays of the third plurality being elongate along a third direction and being spaced from one another so as to define a third gap between the linear arrays in each pair of the third plurality, the third gaps being elongate along the third direction, wherein the third direction is angularly offset from the both the first and second directions.

14. The packaging material of claim 13,
wherein the pattern defines (iv) a fourth plurality of pairs of linear arrays of the adhesive members, the linear arrays of the fourth plurality being elongate along a fourth direction and being spaced from one another so as to define a fourth gap between the linear arrays in each pair of the fourth plurality, the fourth gaps being elongate along the fourth direction, wherein the fourth direction is angularly offset from each of the first, second, and third directions.

15. A packaging material, comprising:
a bendable substrate having a surface; and
a plurality of adhesive members adhered to the surface, each adhesive member comprising a plurality of expandable microspheres,
wherein the adhesive members are arranged on the surface in a pattern so as to define a first pair of linear arrays of the adhesive members that extend along a first direction and are spaced from one another so as to define a first gap that is elongate along the first direction between the linear arrays of the first pair, and a second pair of linear arrays of the adhesive members that extend along a second direction and are spaced from one another so as to define a second gap that is elongate along the second direction between the linear arrays of the second pair, the second direction being angularly offset from the first direction, and
wherein each linear array of the first and second pairs of linear arrays has a plurality of array elements, and each array element defines a rectangle formed from first to fourth ones of the adhesive members, each adhesive member having a triangular shape, the first and third adhesive members spaced from the second and fourth adhesive members so as to at least partially define a gap that extends along a first oblique direction, and the first and second adhesive members spaced from the third and fourth adhesive members so as to at least partially define a gap that extends along a second oblique direction, wherein the first and second oblique directions are each at an oblique angle relative to the first and second directions and are at a non-zero angle relative to one another.

* * * * *